Figure 1:
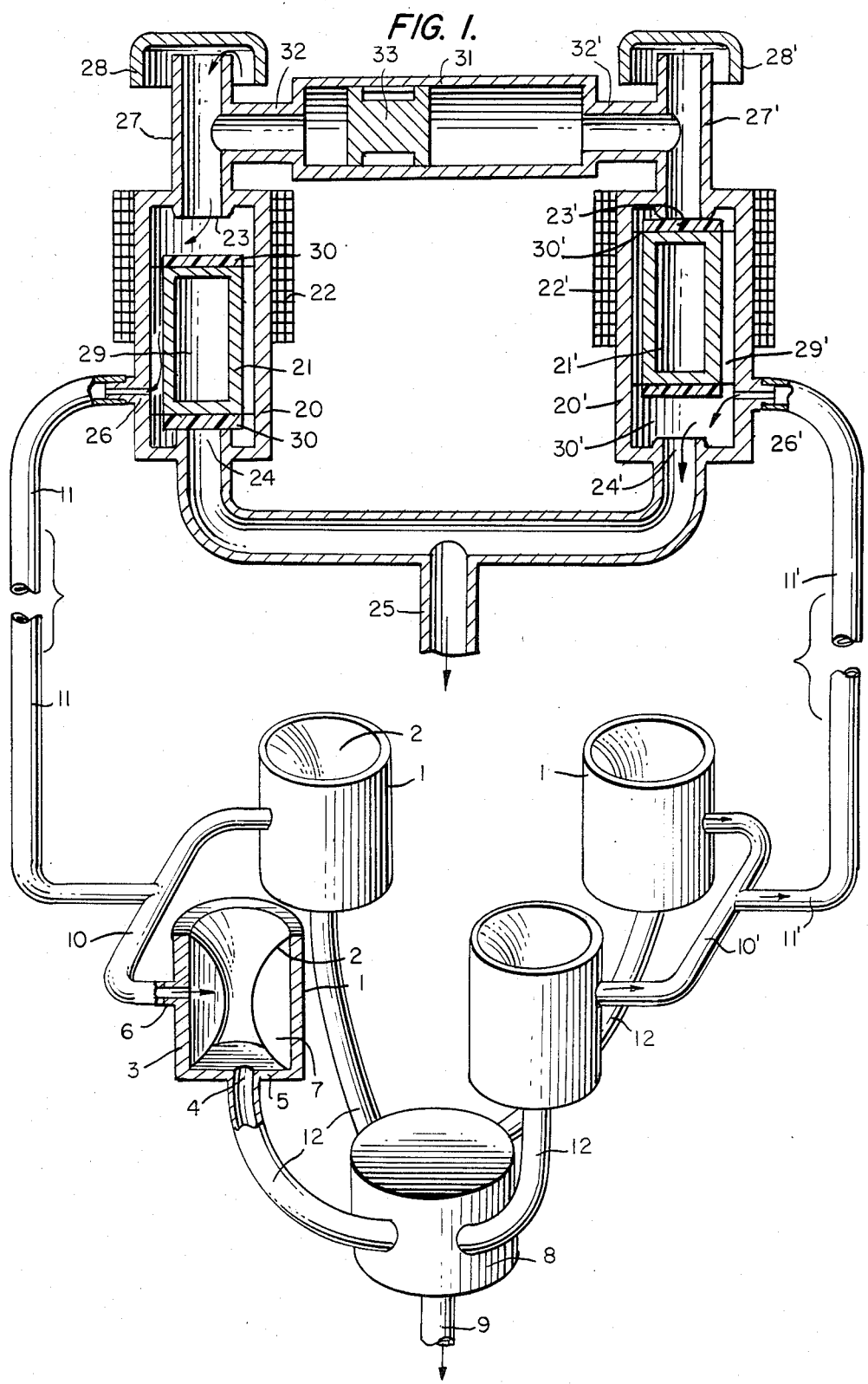

United States Patent [19]

Brayer

[11] Patent Number: 4,524,720
[45] Date of Patent: Jun. 25, 1985

[54] INDICATING DEVICE FOR MILKING APPARATUS

[75] Inventor: Eyal Brayer, Kfar Monash, Israel
[73] Assignee: 501 S.C.R. Engineers, Ltd., Nathania, Israel
[21] Appl. No.: 514,477
[22] Filed: Jul. 18, 1983
[51] Int. Cl.³ ............................................. A01J 5/14
[52] U.S. Cl. .............................. 119/14.14; 119/14.28; 119/14.29
[58] Field of Search ............... 119/14.28, 14.29, 14.37, 119/14.38, 14.39, 14.41, 14.14; 251/137; 137/553, 557, 596.17

[56] References Cited

U.S. PATENT DOCUMENTS 1,030,010 6/1912 Newell ............................. 119/14.28
2,434,586 1/1948 Reynolds ...................... 119/14.28 X

FOREIGN PATENT DOCUMENTS 795702 5/1958 United Kingdom ............. 119/14.28

Primary Examiner—Hugh R. Chamblee
Attorney, Agent, or Firm—Ratner & Prestia

[57] ABSTRACT

An indicating device for a milking apparatus indicates regular or irregular working of each of the four teat cups. The device is attached to a twin electro-pneumatic pulsator which comprises two vertical solenoid-operated units (20, 21, 22), each serving to expand and contract the expandable linings (2) of two teat cups respectively, by alternately admitting atmospheric pressure and vacuum pressure to the teat cups. The device consists of a transparent, hollow cylinder (31) horizontally positioned between the two valve units and pneumatically communicating at each end with the air inlet duct (27) of either valve unit, and of a free piston (33) reciprocatingly movable in the cylinder (31). The alternate change of air pressure in the inlet ducts drives the piston to and fro, and a difference in air pressure in the two ducts, as a result of the teat cups not working uniformly, is indicated by the distance at which the piston stops from the respective end of the cylinder during its reciprocating movement therein.

10 Claims, 2 Drawing Figures

INDICATING DEVICE FOR MILKING APPARATUS

The invention relates to an indicating device for a milking apparatus, more especially to a device adapted to indicate the accurate or inaccurate pulsations of the teat cups attached to a cow's udder.

A conventional milking apparatus consists essentially of four teat cups connected to a collecting vessel by a milk line, all these being kept at sub-atmospheric pressure by means of a vacuum pump. Each of the four cups comprises a rigid, cylindrical outer casing lined with an internal tubular, flexible lining which, together with the casing, forms an annular pressure space. The lining surrounds the teat closely and is kept at the necessary partial vacuum pressure by a flexible connection to the milk line, in its bottom portion, which serves to press the lining onto the teat surface and keeps the cup attached to the teat. The annular space of the teat cup undergoes regular pulsations from atmospheric to sub-atmospheric pressure which is changed by means of a pulsator mechanism connecting it alternately to the atmosphere and to a vacuum line. The pulsations massage the teats and press the milk into the inner space of the teat cup from where it is sucked through the milk line into the collecting vessel. Suitable pulsations are about 60 per minute, but this may be altered to suit various conditions. There are usually two pulsator units each energizing two teat cups, the pulsations being staggered, thus 120 milking pressures are acting on the udder during every minute.

In the past apparatus have been devised for indicating the end of the milking operation after the udder has been almost emptied; these apparatus have also been designed to indicate premature falling off the teat cups, and abnormally short milking time due to sickness of the cow or due to the end of its lactation period. However, these apparatus are not capable to indicate whether all four cups work in perfect order, i.e. each cup sucks milk. Incorrect working may be due to malfunctioning of one of the pulsator units, to a damaged or torn teat cup lining, to clogging of a line or others.

It is, therefore, the object of the present invention to provide an indicating device which should give a visual or acoustic signal to indicate to the atten-dant whether the apparatus works properly or not.

It is another object to provide such indicating device at low cost so as to enable every farm to install it at every milking station.

And it is a final object that the device should be of simple construction, foolproof and easy to clean.

The indicating device of the invention is attached to a twin pulsator which—in a known manner —serves to provide alternate communication between the annular spaces of the teat cups and the atmosphere and the vacuum line provided in the apparatus. Each of the two pulsator units consists of a cylindrical vertical housing which is permanently connected to the annular spaces of two teat cups, and which is provided at its one end with a port connecting it to the atmosphere via a short conduit and filter means, and at its other end with a port connecting it to the vacuum line. In the following the abovementioned first port will be called, for short, the "atmospheric port", and the second port will be called the "vacuum port". A valve body of magnetic material is adapted to reciprocate in the housing, being actuated by an electrical coil wound around the housing, to which current is supplied at the rate of the desired pulsations. When the coil is not energized the valve body drops to the bottom of the housing and closes the vacuum port, thus connecting the teat cups with the atmosphere. The coil is so positioned on the housing outside that, while being energized, it lifts the valve body and presses it against the atmospheric port, thus interrupting connection between the teat cups and the atmosphere and connecting them to the vacuum line. These pressure changes cause alternate expansion and contraction of the lining whereby the milk is extracted from the teat.

The two pulsator units are generally positioned in a common housing which also contains the coils and their energizing circuit; the two units are energized alternately, whereby atmospheric pressure is exerted on two teat cups while the two other cups are under partial vacuum, and vice versa.

The control device of the invention comprises essentially a hollow, preferably horizontally positioned cylinder in which a free piston is adapted to be reciprocatingly moved by pressure difference acting on its respective end faces. The cylinder ends are communicatingly connected to the respective two conduits leading from the outside to the atmospheric ports of the two pulsator units. The piston oscillates at the rate of the pulsations in the cylinder, and its movement is brought to the attention of the attendant by either visual or acoustical means. In a preferred embodiment the cylinder is of a transparent material so as to permit clear vision of the piston movement.

The operation of the device is based on the fact that at the moment the atmospheric port is opened by the valve body and is thus exposed to the low pressure in the pulsator housing, the pressure in the conduit as well as in the line leading to one end of the cylinder of the device, drops somewhat below atmospheric pressure, while the other cylinder end is kept at full atmospheric pressure, since the atmospheric port of the other unit is closed at the time. The pressure differential pulls the piston to one side of the cylinder to the side of the low pressure, where it encounters a stop provided in the cylinder or the end of the cylinder itself. As soon as the atmospheric port of the second unit opens the pressure drops in the conduit at the other end of the cylinder, pulling the piston to the other side of the cylinder. In case the deviation of the piston from the center of the cylinder is equal to both sides, this is a sign that the teat cups work in proper order. But as soon as there is a tear in one of the cup linings, atmospheric pressure will prevail therein and in the respective pulsator housing, causing movement of the piston in one direction only or, in case there exists only a small leak, the piston will reach the stop—or the end of the cylinder—in one direction only, and stop short of the cylinder end in the other direction.

In case only one teat cup of a couple works satisfactorily, this will again be indicated by eccentric motion of the piston.

By providing a wire coil around the cylinder, providing a core of a magnetic material inside the piston and feeding the induced voltage to an electric circuit, the piston movement may serve to give an acoustical or visual signal whenever the piston movement ceases to be symmetric. On the other hand, the signal may be produced as long as the movement is symmetrical, and to cease as soon as it becomes eccentric or ceases altogether.

A modified device consists of a piston movable in a vertical or inclined cylinder which is open to the atmosphere at one end and communicates, at its other end, with the conduits adjacent the atmosphereic ports of the two pulsator units. The pressure drop during alternating opening of the ports serves to raise the piston by a small distance, against gravity, and lets it drop back as soon as the port is fully open. It will be understood that the frequency of the piston is now double the frequency of one pulsator unit, i.e. 120/min in the aforementioned case.

In another embodiment of the device, serving a milking apparatus wherein all four teat cups are pressurized simultaneously, and wherein only one pulsator unit operates all teat cups, the device consists of a piston movable in a vertical cylinder, supported by a helical spring in order to balance the piston weight. The cylinder is open to the atmosphere at its bottom end, and is connected to the aforedescribed conduit to the atmospheric port of the pulsator unit. During each pulse the piston is slightly raised while the atmospheric port is opened, and drops as soon as the port is closed. This movement is of a given magnitude, as long as all teat cups work properly, but becomes smaller as soon as there occurs an irregularity in the motion of the cup linings due to external circumstances.

The piston is preferably provided with a metallic core adapted to induce a voltage in a coil wound around the cylinder, the voltage depending on the height to which the core enters the coil, the latter being connected to a circuit adapted to emit a signal as soon as abnormal movement of the piston is registered.

Figure 2:
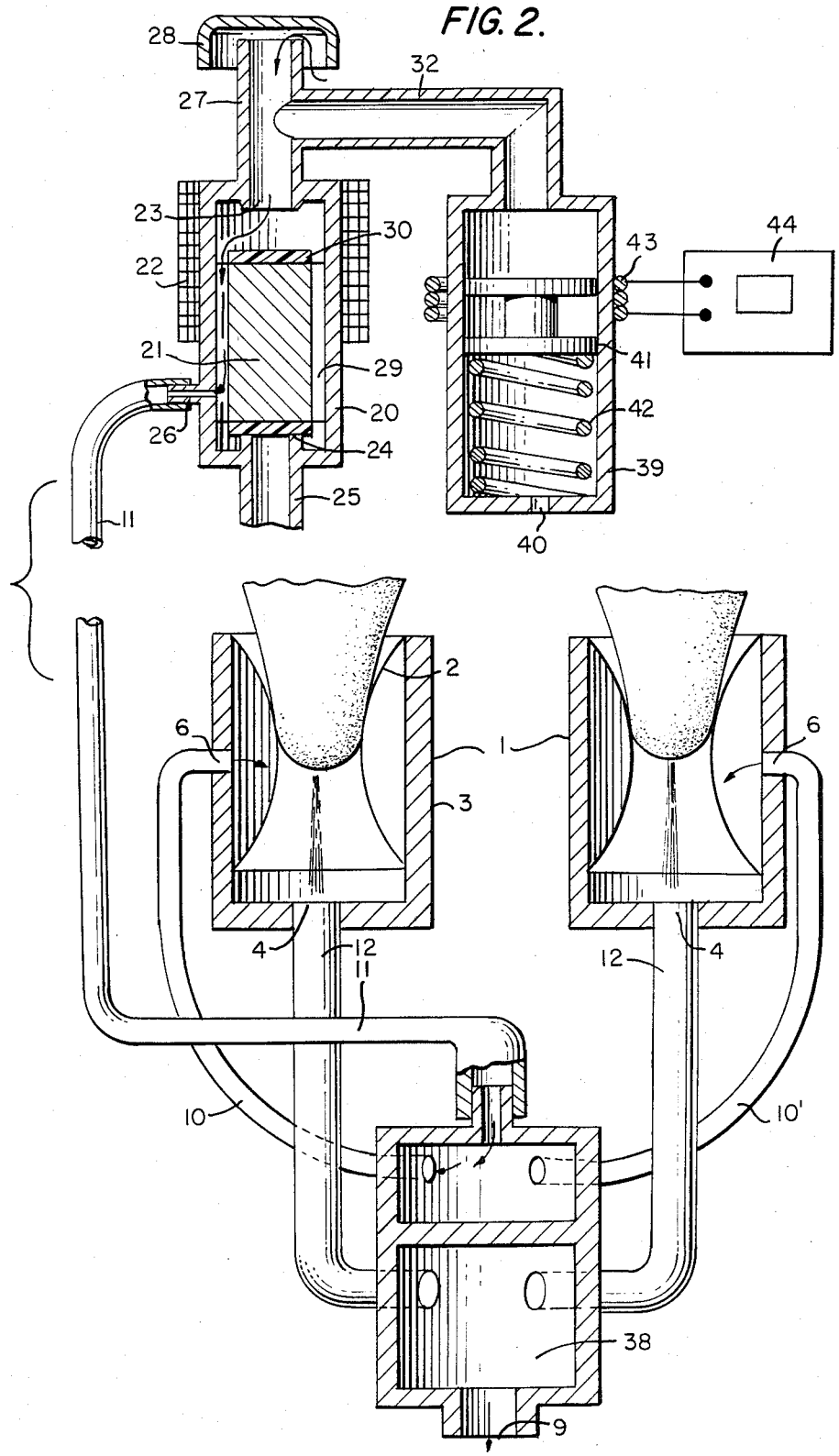

The invention will now be more fully described with reference to the accompanying drawings wherein, FIG. 1 is a diagrammatic drawing of a pulsator operating four teat cups in alternating pulsations, and provided with a visually indicating device, and FIG. 2 is a diagrammatic drawing of a pulsator operating four teat cups in simultaneous pulsations, provided with an electricaly indicating device.

FIG. 1 of the drawings shows four teat cups 1, of which one is shown in section, in order to illustrate the fluid connections and the expandable lining 2. Each teat cup consists of a rigid cylinder 3 open at its top and closed at its bottom 5 with a milk-outlet 4 penetrating the bottom. An air port 6 is provided in the cylinder wall 3 through which alternately air is sucked out of the annular space 7 between the lining 2 and the cylinder wall 3, and atmospheric pressure is permitted to enter it. This alternate pressure expands and contracts the lining against the teat of the udder (shown in FIG. 2) and simulates milking action by hand. The milk extracted from each teat leaves the cups through the openings 4 and hoses 12 and enters a milk chamber 8 common to all four teat cups, from where it is sucked by vacuum pressure through a pipe 9 into a collecting vessel (not shown). The two teat cups on the right side and the two on the left of the drawing are alternately connected to atmospheric pressure and to vacuum pressure through pipes 10, 10' and 11, 11' leading to two pulsator units shown at the top of the figure.

Each pulsator unit, in a known manner, consists of a vertical cylinder 20, 20' which contains a valve body 21, 21' of magnetic material adapted to be axially moved in the cylinder by means of an electric coil 22, 22' wound around the top portion of the cylinder. The cylinder is provided with two ports at its opposite ends, which are alternately closed by the valve body, the port 23 in the top, the "atmospheric port" leading to the outside, and the port 24, 24' in the bottom, the "vacuum port" leading to a vacuum line 25 wherein subatmospheric pressure is maintained by means of an exhauster or compressor.

Each pulsator cylinder is further provided with a third port 26, 26' connecting the cylinder space to one pair of teat cups 1 each through the lines 11 and 11'.

The atmospheric port 23 communicates with the atmosphere through a conduit 27, 27' which is covered at its upper end by a hood 28, 28',serving to prevent intrusion of dust or other impurities. The valve body 21, 21' is provided with longitudinal ribs 29 which permit air to flow between the body proper and the cylinder walls; it is further provided with gasket seals 30, 30' at its both ends cooperating with valve seats projecting around the ports 23 and 24.

Up to this point the pulsator units are of known design: the device according to the invention consists of a transparent cylinder 31 horizontally extending between the two conduits 27, 27' and connected to them by two short pipes 32, 32'. A light free piston 33 is axially movable to and fro in the cylinder as a result of alternate pressure differences in the two conduits 27, 27'. The piston will oscillate about a median position to the right and to the left by equal distances, if the pressure drop in both conduits is the same during each pulsation.

In the position of the pulsator unit depicted in FIG. 1 the left hand valve body closes the vacuum port, owing to the coil 22 not being energized. As a result, air at atmospheric pressure enters the teat cups on the left hand side and expands the linings 2 which were, until then, contracted by the vacuum pressure reigning therein. The pressure difference drives milk out of the teats into the chamber 8. At the moment the valve opens the port 23, the air flow through the conduit causes a certain reduction of pressure therein which drives the piston 33 to the left, owing to the full atmospheric pressure acting on the right end of the piston due to the port 23' being closed.

The piston 21' closes the port 23' by being raised by the energized coil 22', and the teat cups on the right hand side of the drawing are partially emptied of air since this is sucked out through the lines 10', 11', ports 26' and 24' and the vacuum line 25. The linings in the cups are accordingly contracted and the teats are released from pressure. Nevertheless they are held in the teat cups by vacuum pressure maintained in the cup through line 9, the chamber 8 and the lines 12.

It is reiterated that the drawings are purely diagrammatical, with the aim to illustrate the working of the apparatus. They show no technical details, such as the assembly of the units from separate parts, neither do they illustrate ways and means for inserting the pistons or valve bodies into the respective cylinders. The same rule applies to the teat cups which are actually constructed quite differently from the form illustrated herein.

A modification of the indicating device is illustrated in FIG. 2 wherein all four teat cups operate at simultaneous pulsations. Only two of the four cups are illustrated in the bottom portion of the drawing, which are connected to, and operated through, a common double chamber 38, all other parts being similar to those shown in FIG. 1 and indicated by identical numerals. This chamber (38) comprises a lower portion corresponding in size and action to the chamber 8 of the aforedescribed embodiment, and an upper portion connected to the air ports 6 of all teat cups 1, these operating at the same rythm.

One single pulsator unit only is provided in connection with the teat cups, which is substantially identical with either of the two pulsator units described with reference to FIG. 1, the same numerals being used to indicate corresponding parts. The double chamber 38 is connected to the port 26 of the pulsator unit by means of a hose 11 through which alternately air at atmospheric pressure is supplied, or air is sucked out of the chamber through the vacuum port 24, thereby inflating or deflating the teat cup linings. The pulsator action is similar to that of the aforedescribed embodiment in that the valve body 21 is raised by the coil thus closing the port 23, and closing the port 24 while dropping to the bottom when the coil is de-energized.

The duct 27 leading to the outside, is connected to a vertical cylinder 39 of a non-conductive material, through a pipe 32 which transmits the pressure changes in the conduit 27 to the top portion of the cylinder interior. The bottom portion of the cylinder interior is open to the atmosphere via a bore 40 in its bottom. A free piston 41 is movably positioned in the cylinder, the piston being either entirely of a magnetic material or having an inserted magnetic core. The piston is held in the median portion of the cylinder by a weak helical spring 42 which supports its weight and prevents its dropping down to the bottom of the cylinder, when atmospheric pressure acts on its both ends. An electrical coil 43 is wound around a portion of the cylinder and is electrically connected to an electronic circuit 44 adapted to indicate normal or abnormal movement of the piston in the cylinder, depending on the state of the teat cups. The circuit may be set to give a NORMAL signal when the oscillations of the piston reach a given height, and to give a DANGER signal, whenever the oscillations are lower than normal or fail altogether.

A third alternative of the device may comprise a double pulsator, similar to that illustrated in FIG. 1, but instead of a horizontal cylinder 30, a vertical cylinder 39 may be provided, similar to that of FIG. 2, however with two connections to the conduits (27, 27') in its upper portion. It is evident that the alternate pulsations of the two pulsator units will result in oscillations of the piston (41) at double the rate as with the device with one pulsator unit. In this case a torn lining in one of the teat cups or clogging of one line will result in alternate high and low peaks, which will be recorded by the electronic circuit and conveyed to the attendant.

The devices described in the foregoing represent only examples of the possible embodiments of the invention; they may undergo various alterations at the hands of a person skilled in the art, however within the scope of the appended claims.

It is, for instance not necessary to provide the helical spring (42) shown for the device of FIG. 2. The free piston will, without the spring, rest on the bottom of the cylinder and will be raised to a certain height by the pressure drop in the conduit (27).

On the other hand, the device of FIG. 1 may be provided with a free piston of a magnetic material and a cylinder of a non-conductive material surrounded by a coil, an electronic circuit being connected to the coil and being adapted to indicate the length of the stroke of the piston to either side.

I claim:

1. An indicating device for a milking apparatus, adapted to indicate regular or irregular working of each of the four teat cups attached to the udder of a cow, said apparatus comprising two electromagnetic pulsator units, each connected to two of said teat cups and adapted to expand and contract said teat cups by alternately admitting air of atmospheric pressure to, and drawing air by vacuum action out of, said teat cups, said indicating device consisting of a horizontally positioned cylinder containing a free piston and communicating at each end with one of the conduits leading from each pulsator unit to the atmosphere, said piston being driven to axially oscillate in said cylinder by the alternating suction pressure and atmospheric pressure in said conduits, whereby faulty operation of one of said conduits causes changes in the suction pressure in one of said conduits which is indicated by an unequal stroke of said piston to one side from a central position in said cylinder.

2. The indicating device of claim 1, wherein said horizontally positioned cylinder is made of a transparent material.

3. An indicating device for a milking apparatus adapted to indicate regular or irregular working of each of the four teat cups attached to the udder of a cow, said apparatus comprising two electro-pneumatic pulsator units, each connected to two of said teat cups and adapted to expand and contract said teat cups by alternately admitting air of atmospheric pressure to, and drawing air by vacuum action out of, said teat cups, the indicating device consisting of a vertically positioned cylinder containing a free piston, said cylinder being provided in its lower portion with a port open to the atmosphere, and in its upper portion with at least one port communicating with the two conduits leading from each of said pulsator units to the atmosphere, said piston being raised from a lowermost position in said cylinder by each suction pressure pulse in one of said conduits, whereby faulty operation of one of said teat cups is indicated by the rising of said piston to a lower height than that caused by regular working of the remaining teat cups.

4. An indicating device for a milking apparatus adapted to indicate regular or irregular working of each of the four teat cups attached to the udder of a cow, said apparatus comprising one electro-pneumatic pulsator unit, each connected to said teat cups and adapted to expand and contract said teat cups by alternately admitting air of atmospheric pressure to, and drawing air by vacuum action out of, said teat cups, the indicating device consisting of a vertically positioned cylinder containing a free piston, said cylinder being provided in its lower portion with a port open to the atmosphere, and in its upper portion with a port communicating with the conduit leading from said pulsator unit to the atmosphere, sad piston being raised from a lowermost position in said cylinder by each suction pressure pulse in one of said conduits, whereby faulty operation of one of said teat cups is indicated by the rising of said piston to a lower height than that caused by regular working of the teat cups.

5. The indicating device of claims 1, 3 or 4 wherein said device includes a free piston of magnetic material movable in a cylinder of a non-conductive material, an electric coil wound around a portion of said cylinder, and an electronic circuit connected to said coil and adapted to indicate the length of the stroke of said piston in said cylinder, at each pulsation.

6. The indicating device of claims 1, 3 or 4, wherein sad device includes a free piston, containing a magnetic core, movable in a cylinder of a non-conductive material, an electric coil wound around a portion of said cylinder, and an electronic circuit connected to said coil and adapted to indicate the length of the stroke of said piston in said cylinder during each pulsation.

7. The indicating device of claims 3 or 4, wherein a helical spring is positioned in said cylinder supporting said free piston.

8. The indicating device of claims 3 or 4, wherein said vertically positioned cylinder is made of a transparent material.

9. In milking apparatus including four teat cups and at least one electro-pneumatic pulsator adapted to expand and contract said teat cups by alternately admitting air of atmospheric pressure to, and sucking air out of, said teat cups, said pulsator having a conduit to a port communicating with the atmosphere, the improvement which comprises an indicating device characterized by a cylinder provided with at least one air port communicating with said conduit, and a piston in said cylinder, said piston being freely and axially movable in said cylinder in response to changes in pressure in said conduit, whereby faulty operation of said teat cups or said pulsator causes changes in air pressure in said conduit as indicated by abnormal variation in the stroke of said piston.

10. Apparatus as in claim 9 wherein said cylinder is made of a transparent material enabling visual observation of movement of said piston.

* * * * *